Figure 1:
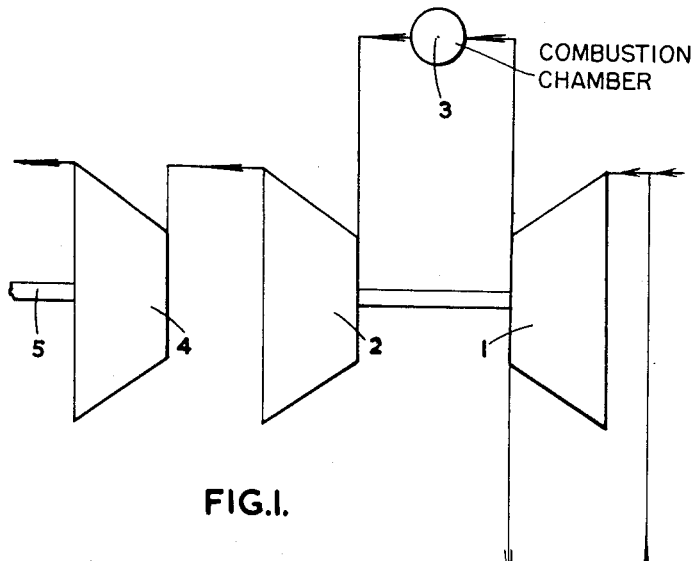
Figure 1:
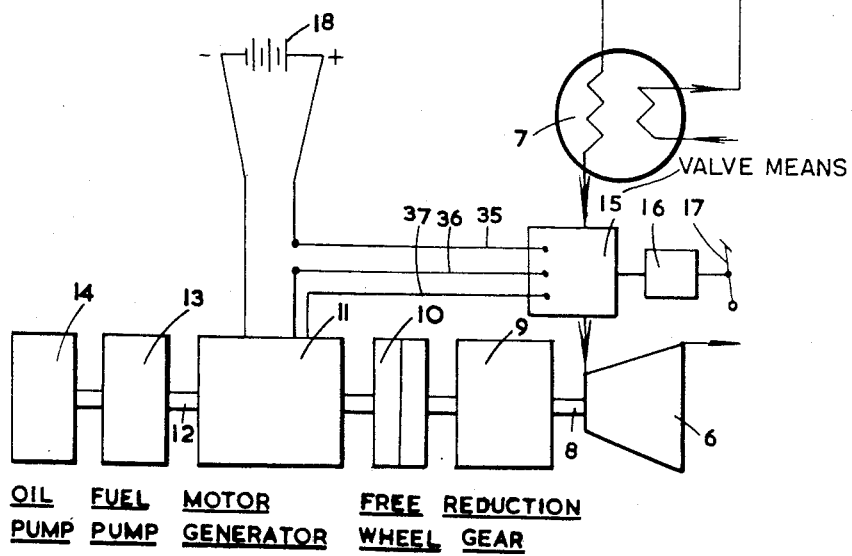

Aug. 23, 1960    S. K. HAMBLING    2,949,731
GAS TURBINE POWER PLANT

Filed April 29, 1958    2 Sheets-Sheet 2

United States Patent Office 2,949,731
Patented Aug. 23, 1960

2,949,731

GAS TURBINE POWER PLANT

Stewart K. Hambling, Coventry, England, assignor to The Standard Motor Company Limited, Coventry, Warwickshire, England Filed Apr. 29, 1958, Ser. No. 731,715

Claims priority, application Great Britain May 20, 1957

1 Claim. (Cl. 60—6)

The invention relates to a gas turbine power plant. Gas turbine power plant often has to drive auxiliary apparatus such, for example, as a fuel pump, a lubricating oil pump and an electric generator, and it is common for these auxiliaries to be driven from a common shaft of a compressor and compressor-driving turbine of the plant. This imposes an undesirable load on the turbine and retards acceleration of the plant.

An object of the invention is to provide a means for driving the auxiliaries with which this disadvantage is mitigated.

According to the invention a gas turbine power plant includes auxiliaries, which, during acceleration of the plant, are arranged to be driven by an electric motor-generator, functioning as a motor, and which, during other conditions of operation of the plant, are arranged to be driven by an air turbine, which is supplied from a compressor of the plant and which is connected to drive the auxiliaries through reduction gearing and to drive the motor generator through a one-way driving device, the motor generator when driven functioning as an electrical generator.

Preferably the auxiliaries are arranged to be driven by the air turbine during idling and normal operation of the plant.

An intercooler may be provided between the compressor and the air turbine. The cooling medium for the intercooler may be air, of which some at least, after passing through the intercooler may be led to the compressor inlet.

Air exhausted from the air turbine may be led to condition the atmosphere in a vehicle equipped with the power plant or in a living-space.

Figure 2:
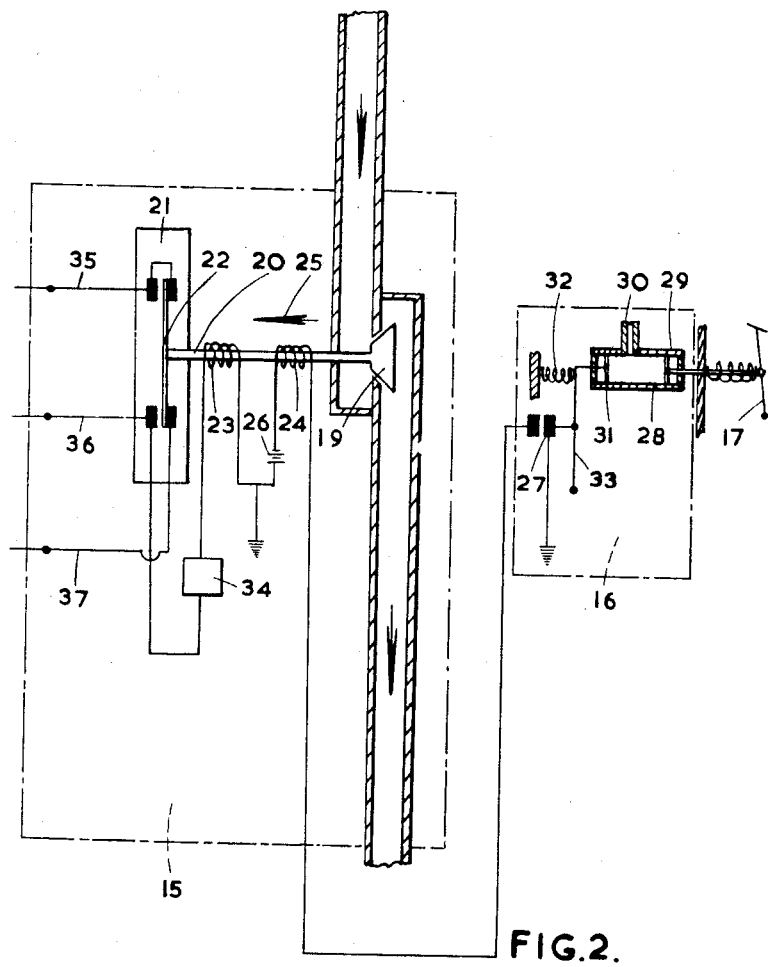

By way of example, an embodiment of the invention will now be described with reference to the drawing, in which:

Figure 1 shows a diagrammatic cycle arrangement of a gas turbine power plant, particularly suitable for driving a road vehicle, and Figure 2 shows in more detail a control device shown in Figure 1.

The plant comprises a compressor 1, a compressor-driving turbine 2, a combustion chamber 3 and an independent power turbine 4. The power output is available at the shaft 5 of the power turbine 4. Compressed air is delivered from the compressor 1 to the combustion chamber 3 in the usual way; but there is also an additional outlet from the compressor 1 to an air turbine 6, via an intercooler 7 and a valve means 15. The valve means 15 is operated from the accelerator pedal 17 (or operating lever) of the plant via a control device 16. The rotor of the air turbine drives a motor-generator 11, through a shaft 8, a reduction gear 9 and a free-wheel or other one-way driving device 10. The motor-generator has a shaft 12 for driving a fuel-pump 13 and a lubricating oil-pump 14. The arrangement is such that, during acceleration of the turbine 2 and compressor 1 the motor-generator, functioning as a motor connected to a battery 18, drives the two pumps 13, 14. The free-wheel device 10 permits this to be done without the reduction gear and the air turbine being rotated. At idling and during normal running, the air supply from the compressor 1 to the air turbine 6 drives the latter. The air turbine drives, through the reduction gear 9 and the free-wheel device 10, the motor-generator, functioning as a generator, and the pumps 13 and 14.

Thus with the above arrangement the pumps 13 and 14 are either driven by the air turbine 6 during idling and normal running of the plant, the motor-generator then functioning as a generator, or by the motor-generator operating as a motor when the plant is accelerating. Although only pumps 13 and 14 have been shown, other auxiliaries may be driven in this way.

The intercooler 7 employs as the heat-exchange fluid, co-acting with the compressed air delivered by the compressor 1, air drawn in from the atmosphere. This air, after passing through the intercooler, is delivered to the inlet of the compressor 1.

Alternatively the intercooler need not be connected to the compressor inlet and may instead discharge to atmosphere; but then an additional blower for cooling air for the intercooler would be required.

The air exhausted from the air turbine 6 may be discharged to atmosphere, or some at least may be led to condition the atmosphere in a vehicle equipped with the power plant or in a living-space.

The control device 16 and the valve means 15 are shown in greater detail in Figure 2. The valve means 15 includes a valve 19 in the ducting connecting the compressor 1 and the air turbine 6. The valve 19 is mounted on a rod 20, which is connected to a contact plate 22 of a switch 21, for changing the motor-generator circuit from a motor to a generator circuit and vice versa. The rod 20 passes through solenoids 23, 24, which when energised move the rod 20 and the valve 19 in the direction of arrow 25, to close the valve 19 and to change the motor-generator circuit from the generator to the motor circuit. In the position illustrated the solenoids are not energised, the valve 19 is open, permitting flow of compressed air from the compressor 1 to the air turbine 6 and the motor-generator is functioning as a generator. The solenoid 24 is energised from a battery 26 connected in a circuit through a switch 27 in the control device 16. The switch 27 is closed upon rapid depression of the accelerator pedal 17, such as will occur on acceleration. The pedal 17 as well as controlling the power output of the plant is connected to a piston 29 slidable in a cylinder 28. The cylinder has a bleed orifice 30 which allows operating fluid in the cylinder 28 to escape on slow depression of the piston 29, but which restricts the escape of fluid on rapid depression of the piston 29. At the end of the cylinder remote from the pedal 17, there is a piston 31, loaded by a spring 32 against depression and arranged to operate the switch 27 through a lever 33. Thus on rapid depression of the pedal the solenoid 24 is energised, thereby closing the valve 19, but on slow depression of the pedal the solenoid 24 is not energised and the valve 19 remains open. The solenoid 23 is connected, via a short-interval time switch 34 and the motor switch 21, to the battery 18, so that when the solenoid 24 closes the valve, the solenoid 23 is also energised and serves to hold the valve closed until the time-switch 34 has opened or until air pressure from the compressor acting on the left-hand side of the valve 19 overcomes the solenoid 23 and returns the valve and switch to the position shown in Figure 2. The electrical circuits of the motor-generator are not shown in detail as they do not form part of the invention. By way of illustration, the switch 21 has three wires 35, 36, 37. The two wires 35 and 36 connect the motor circuit to the battery 18 and the two wires 35 and 37 complete the generator circuit.

What I claim as my invention and desire to secure by Letters Patent of the United States is:

A gas turbine power plant comprising a compressor, a turbine, first shaft means connecting said turbine and compressor, combustion chamber means connected between said turbine and compressor, auxiliaries for said plant, an electric motor generator, second shaft means connecting said motor generator to the auxiliaries, an air turbine, duct means between the compressor and the air turbine to supply compressed air to the air turbine, a control valve positioned in said duct means, reduction gearing, a one-way driving device, third shaft means interconnecting, through said reduction gearing and said one-way driving device, said air turbine and said motor generator, an electrical circuit, whereby said motor generator can be operated alternatively as a motor and as a generator, and control means operative, on acceleration of the plant, to close said control valve and also so to change said electrical circuit that said motor generator can be operated as a motor to drive the auxiliaries, and, during other conditions of operation of the plant, to open said control valve and also so to change said electrical circuit that said motor generator can be operated as a generator, the auxiliaries then being driven by said air turbine, said control means including a cylinder, a piston slidable in said cylinder, a control member of the plant, a connection between said control member and said piston, a pressure-responsive element in said cylinder and means defining a leak opening between said piston and said element, whereby said element is responsive only to rapid movement of said piston.

References Cited in the file of this patent

UNITED STATES PATENTS

| 1,343,666 | Ehrhart | June 15, 1920 |
| 1,364,488 | Doble | Jan. 4, 1921 |
| 2,428,830 | Birmann | Oct. 14, 1947 |
| 2,612,020 | Griffith | Sept. 30, 1952 |
| 2,637,984 | Bloomberg | May 12, 1953 |
| 2,731,792 | Nallinger | Jan. 24, 1956 |
| 2,840,986 | Davies et al. | July 1, 1958 |

FOREIGN PATENTS

| 460,206 | Italy | Nov. 13, 1950 |